United States Patent
Kang

(10) Patent No.: US 8,326,529 B2
(45) Date of Patent: Dec. 4, 2012

(54) METHOD FOR DISPLAYING INTERSECTION ENLARGEMENT IN NAVIGATION DEVICE

(75) Inventor: Dae Hyun Kang, Namyangju-si (KR)

(73) Assignee: M & Soft, Inc., Gangnam-Gu, Seoul (KR)

( * ) Notice: Subject to any disclaimer, the term of this patent is extended or adjusted under 35 U.S.C. 154(b) by 347 days.

(21) Appl. No.: 12/654,056

(22) Filed: Dec. 9, 2009

(65) Prior Publication Data

US 2010/0094542 A1 Apr. 15, 2010

Related U.S. Application Data

(63) Continuation of application No. PCT/KR2007/003349, filed on Jul. 11, 2007.

(30) Foreign Application Priority Data

Jun. 25, 2007 (KR) .................. 10-2007-0061963

(51) Int. Cl.
*G08G 1/0962* (2006.01)
*G08G 1/0969* (2006.01)
*G01C 21/34* (2006.01)
G08G 1/0967 (2006.01)
G08G 1/0968 (2006.01)

(52) U.S. Cl. ......... 701/437; 701/436; 701/455; 701/458

(58) Field of Classification Search .......... 701/200–226, 701/400–541

See application file for complete search history.

(56) References Cited

U.S. PATENT DOCUMENTS

| | | | | |
|---|---|---|---|---|
| 5,323,321 A * | 6/1994 | Smith, Jr. | ...................... | 701/428 |
| 5,410,486 A * | 4/1995 | Kishi et al. | ..................... | 701/437 |
| 5,732,385 A * | 3/1998 | Nakayama et al. | ........... | 701/437 |
| 5,835,881 A * | 11/1998 | Trovato et al. | ................. | 701/431 |
| 6,006,161 A * | 12/1999 | Katou | ............................ | 701/410 |
| 6,088,652 A * | 7/2000 | Abe | ............................... | 701/410 |
| 6,119,066 A * | 9/2000 | Sugiura et al. | ................. | 701/428 |
| 6,151,552 A * | 11/2000 | Koizumi et al. | ............... | 701/428 |
| 6,243,646 B1 * | 6/2001 | Ozaki et al. | .................... | 701/533 |
| 6,694,255 B1 * | 2/2004 | Kainuma et al. | ............... | 701/428 |
| 2005/0273256 A1* | 12/2005 | Takahashi | ....................... | 701/211 |
| 2006/0031005 A1* | 2/2006 | Sakano et al. | ................. | 701/200 |
| 2007/0005241 A1* | 1/2007 | Sumizawa et al. | ............ | 701/211 |
| 2008/0040024 A1* | 2/2008 | Silva | ............................. | 701/200 |
| 2008/0189035 A1* | 8/2008 | Tsurumi | ........................ | 701/209 |

FOREIGN PATENT DOCUMENTS

| | | |
|---|---|---|
| JP | 2005-326333 | 11/2005 |
| JP | 2006-064509 | 3/2006 |
| JP | 2007-010356 | 1/2007 |
| KR | 10-2004-0022742 | 3/2004 |
| KR | 10-2006-0106407 | 10/2006 |

* cited by examiner

*Primary Examiner* — Khoi Tran
*Assistant Examiner* — Dale Moyer
(74) *Attorney, Agent, or Firm* — Bacon & Thomas, PLLC

(57) ABSTRACT

The present invention relates to a method for displaying enlargement images of an intersection in a navigation device. More particularly, the present invention is characterized to provide enlargement images of an intersection in sequence, thereby improving visibility and accuracy of a navigation device in providing direction guidance at intersections. The present invention of a method for displaying enlargement images of an intersection in a navigation device, wherein the navigation device finds a path to destination to guide a user thereof, includes calculating distance-to-go from a present position of a vehicle to an intersection in the path; estimating a predicted time to reach said intersection on the basis of the speed of said vehicle and said distance-to-go to said intersection; and displaying enlargement images of said intersection at a set time before said predicted time to reach said intersection.

15 Claims, 5 Drawing Sheets

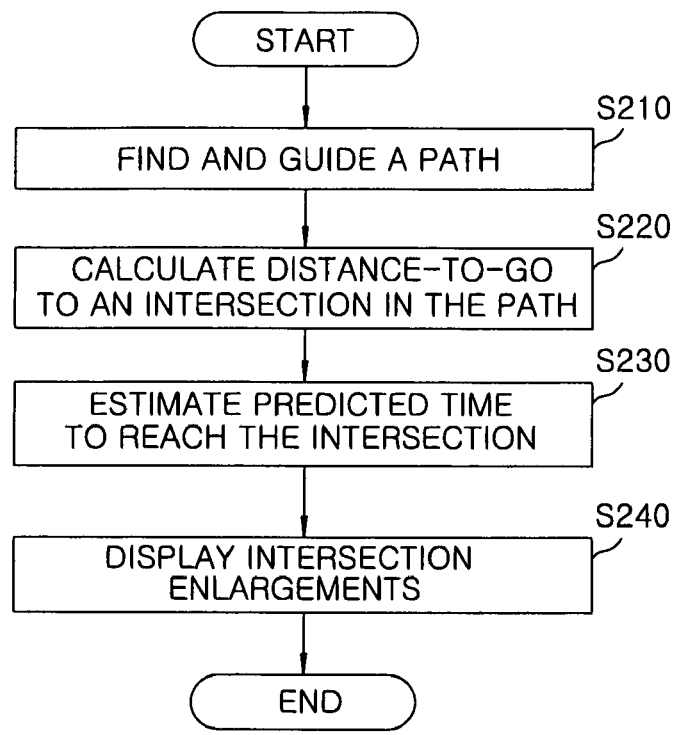
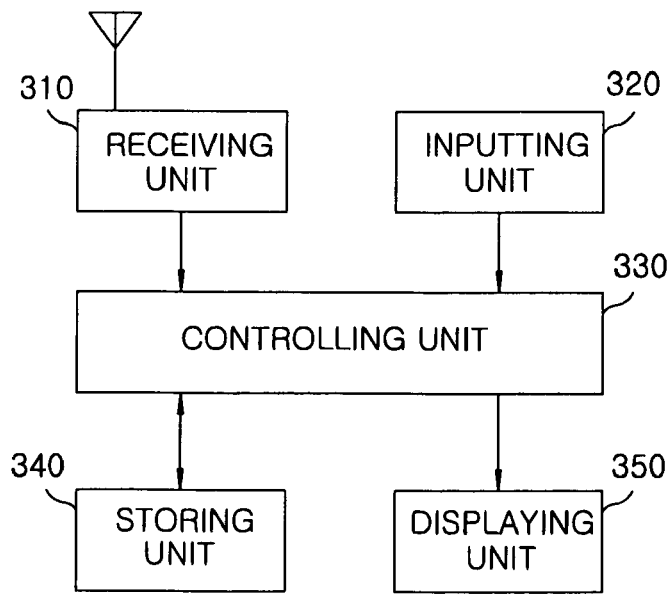

METHOD FOR DISPLAYING INTERSECTION ENLARGEMENT IN NAVIGATION DEVICE

This application is a Continuation Application of PCT International Application No. PCT/KR2007/003349 filed on 11 Jul. 2007, which designated the United States.

FIELD OF THE INVENTION

The present invention relates to a method for displaying enlargement images of an intersection in a navigation device. More particularly, the present invention is characterized to provide a method for displaying enlargement photos or three-dimensional images of an intersection in sequence with different enlargement ratio for each, thereby improving visibility and accuracy of a navigation device in providing a direction at intersections.

BACKGROUND OF THE INVENTION

A navigation device is generally stationed in a car or installed on board, and serves a driver as a means to check the present location and speed of a car by receiving precise microwave signals transmitted by plural satellites utilized by Global Positioning System (GPS). It is generally called "a navigation". Such a navigation device displays on its screen the present position of a car which is calculated by use of GPS as well as map data retrieved from the memory device included therein, thereby enabling a user thereof to know the present location on the map in real time. In addition, a navigation device is able to search a path from a departure to a destination with waypoint data inputted by a user, and has a function to guide the user therewith by a means of voice or an image.

FIG. 1 is an embodiment of a method for showing an intersection enlargement image in a conventional navigation device.

A conventional navigation device provides a direction with an enlarged image at an intersection which is located in the course of a car, while the device is displaying a desired path on the screen, wherein the enlarged image can be two-dimensional or three-dimensional.

Conventional methods, however, have limitations in providing an exact direction at a complex intersection or interchange such as one with a multi-legs, an on/off-ramp of an expressway or a underpass. Failure to provide a driver with an exact direction guides the driver into a wrong direction.

Besides, conventional methods have a shortcoming in that it provides an intersection enlargement image calculating distance-to-go from the car's present spot without taking into account of the predicted time when to reach the intersection along with the present speed, thereby guiding a driver inexactly.

SUMMARY OF THE INVENTION

Accordingly, the present invention has been made in view of the above problems occurring in the prior art, and it is an object of the present invention to provide a method for displaying enlargement images of an intersection in sequence as a vehicle approaches the intersection, thereby performing path guidance with accuracy and giving a user high sense of reality.

Another object of the present invention is to provide a method for displaying enlargement images of an intersection in sequence, thereby improving visibility in path guidance at an intersection.

The above object of the present invention can be achieved by a method for displaying enlargement images of an intersection in a navigation device, wherein the navigation device finds a path to destination to guide a user thereof, includes: calculating distance-to-go from a present position of a vehicle to an intersection in the path of said vehicle's proceeding; estimating a predicted time to reach said intersection on the basis of the speed of said vehicle and said distance-to-go to said intersection; and displaying enlargement images of said intersection at a set time before said predicted time to reach said intersection.

Another object of the present invention can be achieved by a navigation device of displaying enlargement images of an intersection, the navigation device finds a path to destination to guide a user thereof, comprises a receiving unit to receive position signals from a satellite; an inputting unit to generate input signals upon an input by a user; a controlling unit to calculate distance-to-go from a vehicle to an intersection which is in the path on which said vehicle is running and a predicted time to reach said intersection on the basis of said distance-to-go and a speed of said vehicle, and to control displaying enlargement images of said intersection; a storing unit to store map data, position data, and images of intersections; and a displaying unit to display enlargement images of said intersection.

The present invention has advantageous effects in that it can guide a driver to exact direction with more heightened reality by providing enlargement images of an intersection in sequence, which are gradually more enlarged, as the car approaches an intersection.

The present invention also has advantageous effects in that it improves visibility in guiding direction at an intersection by displaying enlargement images of the intersection with different enlargement ratio for each image, which is controlled step by step in accordance with a car's approaching the intersection.

BRIEF DESCRIPTION OF THE DRAWINGS

FIG. 2 is a flowchart illustrating a method for displaying intersection enlargements according to the present invention;

FIG. 3 is a block diagram showing a navigation device performing the method for displaying intersection enlargements according to the present invention;

DETAILED DESCRIPTION OF THE EMBODIMENT

Figure 1:
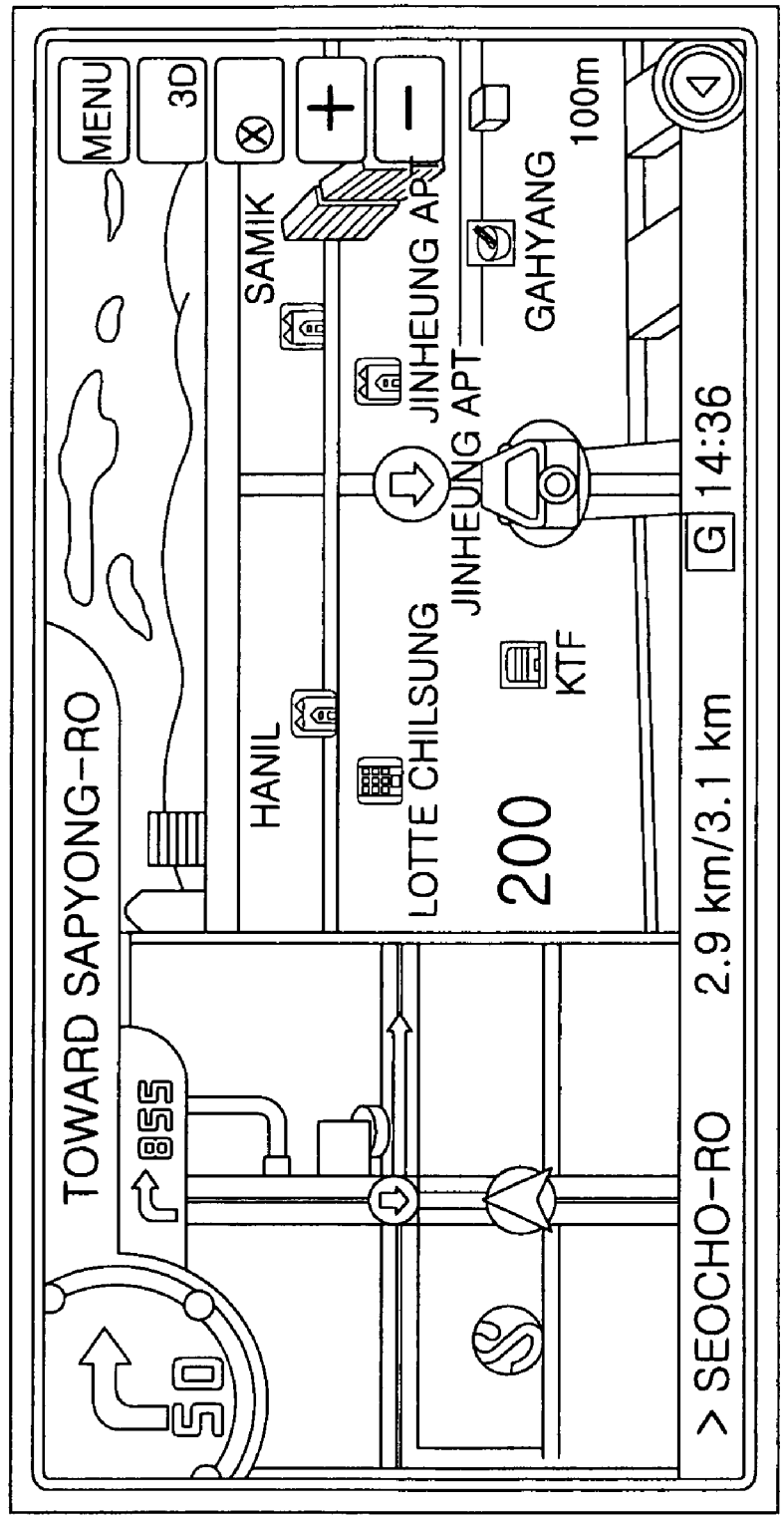
FIG. 1 is an embodiment of a method for showing an intersection enlargement image in a conventional navigation device.

Hereinafter, a preferred embodiment of the present invention will be described in further detail with reference to the accompanying drawings. Prior to this, the terms or words used in the specification and claims are not limited to usual or dictionary meaning, but the present invention should be understood by the meaning or concepts matching to the technical spirits of the present invention on the basis of such principles that the scope of the term can be properly defined to explain the present invention with the best method by the inventor.

Thus, since the embodiments described in the present specification and the construction described on the accompanying drawings are only the preferred embodiments, but do not represent for all technical aspects of the present invention, it should be understood that various equivalents and modification examples exist for replacing with the technical aspects of the present invention at the time of filing the present invention.

FIG. 2 is a flowchart illustrating a method for displaying intersection enlargements according to the present invention.

The present invention is implemented by a navigation device, which finds a path for a user to take and guides the user to the direction when the user inputs his/her destination therein (S210). The present invention is especially useful when the driver has to pay attention to which road to take at an intersection.

Said navigation device can capture the car's present position by calculating coordinates with satellite signals, which is received by GPS receiving unit thereof, and a location of an intersection in the track of the vehicle by use of map data, which is stored in storing unit thereof.

In addition, said navigation device calculates distance-to-go to the intersection based on the current position of the vehicle and the location of the intersection, and corrects, by real time calculation, the distance-to-go in constant change as the car approaches the intersection (S220).

As a result, predicted time to reach the intersection can be estimated based on the distance-to-go to the intersection from the position of the car and the current speed of the car (S230).

The present invention of a method for displaying enlargement images of an intersection in a navigation device is characterized by displaying the enlargement images of an intersection earlier than a set time before the predicted time to reach the intersection as the car getting closer to the intersection in the path (S240).

When the enlargement images of the intersection are displayed earlier than a set time before the predicted time to reach the intersection, the enlargement ratio of each image is controlled step by step according to the time-to-go to the intersection. For example, if the time for the enlargement images of the intersection to be displayed is one minute before the predicted time to reach the intersection, the enlargement images begin to be sequentially displayed on the screen of the navigation device one minute before the predicted time, and each image is displayed with different enlargement ratio as the car approaches the intersection.

Conventional methods for displaying an enlargement image on the basis of distance-to-go to an intersection have a drawback of low accuracy in direction guidance by displaying an intersection enlargement image, which is caused by error of GPS signals and inexactness in calculating the distance-to-go in constant change according to the current speed of a car.

In a method for displaying enlargement images of an intersection according to the present invention, the enlargement images of an intersection are displayed on the basis of time left for the car to reach the intersection; and the enlargement ratio for each image is controlled in accordance with each predicted time to reach the intersection, which is on changing as the car getting closer to the intersection.

In addition, in the present invention of a method for displaying intersection enlargement images, time to display the intersection enlargement images can be differently set according to a type of the road on which a car is running, thereby improving the accuracy in direction guidance at an intersection. For instance, as for a car driving on a general local road, the time for intersection enlargement images to be displayed can be set as fifty seconds before the predicted time to reach the intersection and as for a car driving on an expressway, the time for intersection enlargement images to be displayed can be set as one minute before the predicted time to reach the intersection, thereby taking into account of difference in average driving speed according to a type of a road.

Time for intersection enlargement images to be displayed according to a type of a road can be set automatically by the navigation device's recognition of the road type based on the present position of the car, or can be set by the user thereof. To take another instance, even if the time for intersection enlargement images to be displayed in a car driving on an expressway is automatically set as one minute before the predicted time to reach the intersection, the set time to display intersection enlargement images can be adjusted by the user as one and a half minutes, thereby performing direction guidance at an intersection with enlargement images thereof earlier than the originally set time.

Meanwhile, enlargement images of an intersection can be real photos or 3D images. In the embodiment of the present invention of a method for displaying enlargement images of an intersection, merged enlargement images are employed: the backgrounds thereof are from real photos, and the road, the directional sign, and the direction sign-arrow thereof are 3D graphic images.

Therefore, the present invention can provide path guidance with higher sense of reality by use of real photos of a view around the road, and can heighten the visibility in the guidance by use of 3D image road and directional signs.

Besides, the 3D images for roads, directional signs and direction sign-arrows can be more and more enlarged gradually as the car approaches the intersection, thereby serving as signals to have the driver informed that the car comes closer to the intersection. When the guidance is made by voice, the volume or the interval thereof can be controlled in order to give the user information of getting closer to the intersection easily as well.

FIG. 3 is a block diagram showing a navigation device performing the method for displaying intersection enlargements according to the present invention.

A navigation device which performs the method for displaying enlargement images of an intersection according to the present invention comprises a receiving unit 310 to receive location signals from a satellite; an inputting unit 320 to receive inputs by a user; a controlling unit 330 to control displaying enlargement images of an intersection by calculating time for a vehicle to reach an intersection in the path thereof based on the real time distance between the present position of the vehicle and the location of the intersection and the current speed of the vehicle; a storing unit 340 to store map data, location data, and intersection images and a displaying unit 350 to display enlargement images of intersection on the screen thereof.

The controlling unit 330 controls displaying said enlargement images of said intersection at a set time before the predicted time for the vehicle to reach the intersection, wherein said set time can be adjusted by a setting of the user, and also controls enlargement ratio for each of said intersection enlargement images to be displayed in sequence as the vehicle approaches the intersection.

The navigation device which implements the method for displaying enlargement images of intersection according to the present invention adopts a merged image for an intersection enlargement image, wherein the merged image has a real photo of a view around an intersection and one or more of 3D image of the road, the directional sign, the direction sign-arrow thereof, and displays the enlargement image of the intersection through the displaying unit 350.

Figure 4A:
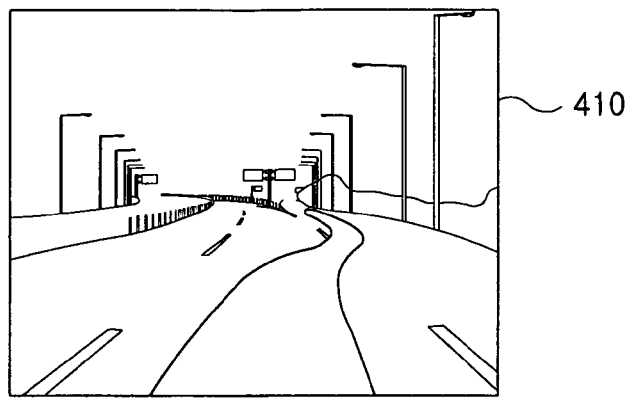
FIGS. 4A to 4E show an embodiment of a method for displaying intersection enlargements in a navigation device according to the present invention.
Figure 4B:
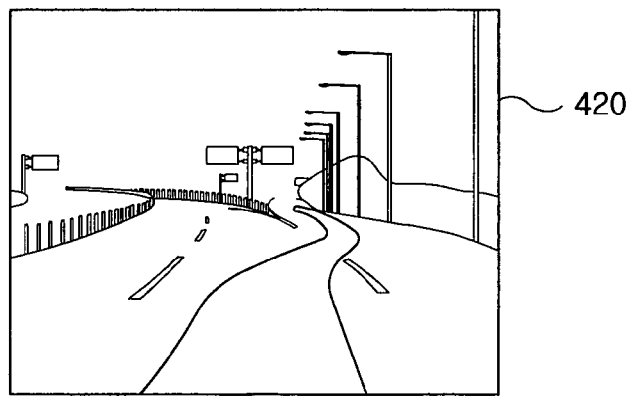
Figure 4C:
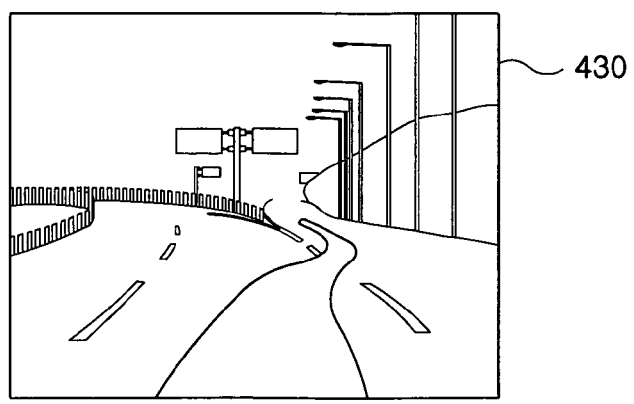
Figure 4D:
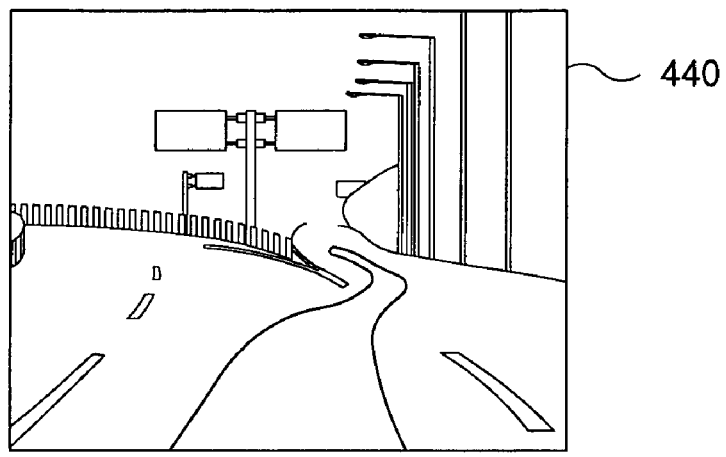
Figure 4E:
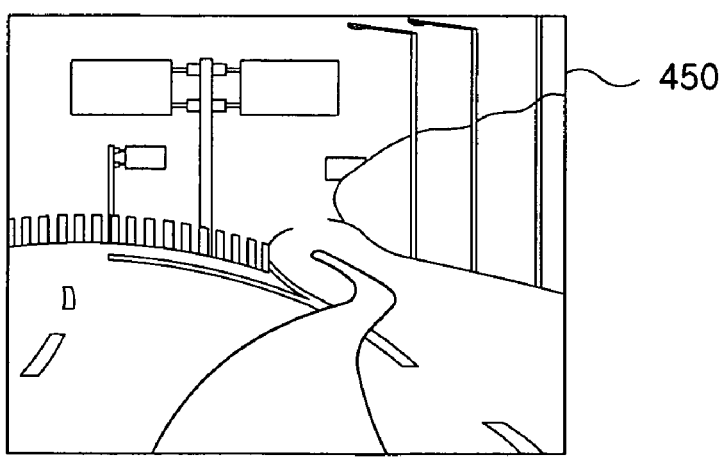

FIGS. 4A to 4E show an embodiment of a method for displaying intersection enlargements in a navigation device according to the present invention.

The intersection enlargement images 410 to 450 in respective FIGS. 4A to 4E are shown in sequence in a navigation device according to the present invention of a method for displaying intersection enlargements. After the navigation device calculates predicted time for the vehicle to reach an intersection in the path on the basis of the distance from the vehicle to the intersection and the speed of the vehicle, and the navigation device displays an intersection enlargement image 410 at a set time before the predicted time to reach the intersection.

When the navigation device displays the intersection enlargement images sequentially, the images 420 to 450 are enlarged with increased enlargement ratio for each image as the car gets closer to the intersection. This characteristic improves visibility in direction guidance at an intersection and gives the user more sense of reality due to a merged image with a real photo and at least one of 3D images.

Figure 5A:
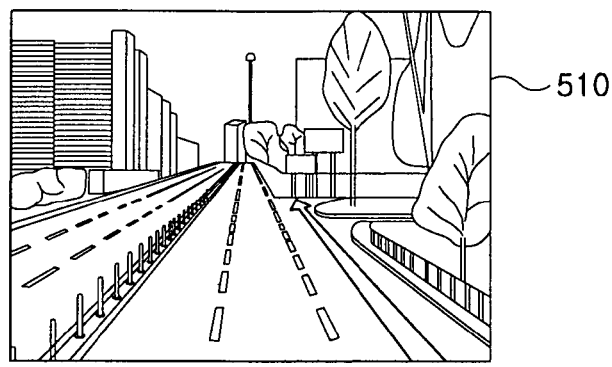
FIGS. 5A to 5D show another embodiment of a method for displaying intersection enlargements in a navigation device according to the present invention.
Figure 5B:
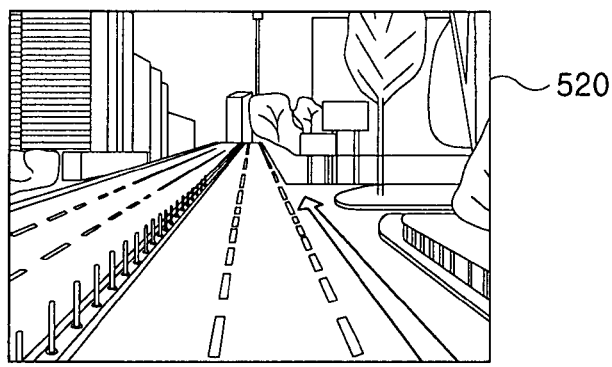
Figure 5C:
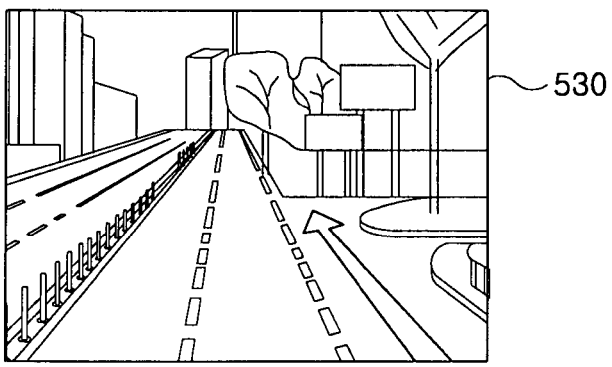
Figure 5D:
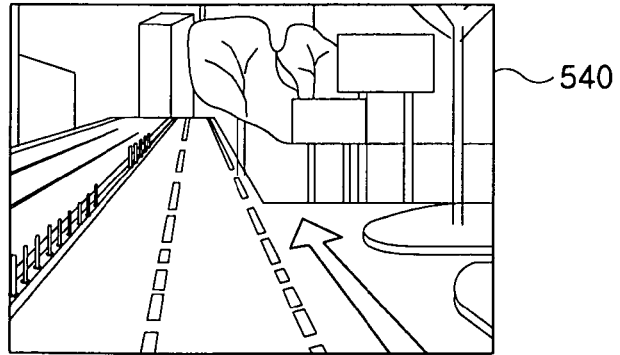

FIGS. 5A to 5D show another embodiment of a method for showing intersection enlargements in a navigation device according to the present invention.

In the embodiment shown in FIGS. 5A to 5D, the enlargement images of an intersection employ merged images 510 to 540 with a real photo for the background thereof and 3D graphic images for the road, the directional sign, the direction sign-arrow thereof, which performs guidance at a fork of a road which is in the course of a vehicle.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for displaying an intersection through a navigation device to guide a user through a path to destination, the method comprising:
   calculating distance-to-go from a present position of a vehicle to the intersection in the path;
   estimating, using a processor, a predicted time to reach the intersection on the basis of the speed of the vehicle and the distance-to-go to the intersection; and
   displaying, based on the predicted time, a plurality of three-dimensional enlargement images of the intersection in sequence, each of the enlargement images of the intersection being enlarged with a different enlargement ratio before said predicted time to reach said intersection.

2. The method of claim 1, wherein the predicted time to reach the intersection is estimated on the basis of one or both of the speed of the vehicle and the distance-to-go to the intersection, which is in constant change according to the proceeding of the vehicle.

3. The method of claim 2, wherein the set time of said displaying the enlargement images of the intersection is adjustable according to a type of a road on which the vehicle runs, by setting of a user, or by both thereof.

4. The method of claim 1, wherein the enlargement images of the intersection are merged images with a real photo of a view around the intersection as the background thereof and a three-dimensional image of at least one of a road, a directional sign, and a direction sign-arrow.

5. The method of claim 1, further comprising:
   outputting a voice guidance, whose volume or interval is controllable corresponding to displaying the enlargement images of the intersection.

6. The method of claim 1, wherein the set time of said displaying the enlargement images of the intersection is adjustable according to a type of a road on which the vehicle runs, by setting of a user, or by both thereof.

7. The method of claim 1, wherein, said displaying the enlargement images of the intersection starts at a set time before the predicted time to reach the intersection.

8. The method of claim 1, wherein said displaying the enlargement images of the intersection is performed so that the enlargement ratio for said each of the enlargement images increases as the vehicle approaches the intersection.

9. A navigation device for guiding a user through a path to destination, the navigation device comprising:
   a receiving unit to receive position signals from a satellite;
   an inputting unit to generate input signals upon an input by a user;
   a control unit to calculate distance-to-go from a present position of a vehicle to an intersection in the path and to estimate a predicted time to reach the intersection on the basis of the distance-to-go and the speed of the vehicle;
   a storing unit to store map data, position data, and images of intersections; and
   a displaying unit to display a plurality of three-dimensional enlargement images of the intersection,
   wherein the control unit controls the displaying unit based on the predicted time to display the enlargement images of the intersection in sequence so that the enlargement images of the intersection is enlarged with different enlargement ratio.

10. The navigation device of claim 9, wherein the control unit controls said displaying the enlargement images of the intersection to start at a set time before the predicted time to reach the intersection.

11. The navigation device of claim 10, wherein the set time of said displaying the enlargement images of the intersection is adjustable according to a type of a road on which the vehicle runs, by setting of the user, or by both thereof.

12. The navigation device of claim 9, wherein the predicted time to reach the intersection is estimated on the basis of one or both of the speed of the vehicle and the distance-to-go to the intersection, which is in constant change according to the proceeding of the vehicle.

13. The navigation device of claim 9, wherein the enlargement images of the intersection are merged images with a real photo of a view around the intersection as the background thereof and a three-dimensional image of at least one of a road, a directional sign, and a direction sign-arrow.

14. The navigation device of claim 9, wherein the set time of said displaying the enlargement images of the intersection is adjustable according to a type of a road on which the vehicle runs, by setting of the user, or by both thereof.

15. The navigation device of claim 9, wherein the control unit controls said displaying the enlargement images of the intersection so that the enlargement ratio for said each of the enlargement images increases as the vehicle approaches the intersection.

* * * * *